(12) United States Patent
Zhu et al.

(10) Patent No.: US 10,712,189 B2
(45) Date of Patent: Jul. 14, 2020

(54) METHOD FOR OPERATING A MEASURING TRANSDUCER OF VIBRATION-TYPE

(71) Applicant: Endress+Hauser Flowtec AG, Reinach (CH)

(72) Inventors: Hao Zhu, Freising (DE); Alfred Rieder, Landshut (DE)

(73) Assignee: Endress+Hauser Flowtec AG, Reinach (CH)

( * ) Notice: Subject to any disclaimer, the term of this patent is extended or adjusted under 35 U.S.C. 154(b) by 39 days.

(21) Appl. No.: 16/312,137

(22) PCT Filed: May 18, 2017

(86) PCT No.: PCT/EP2017/061918
§ 371 (c)(1),
(2) Date: Dec. 20, 2018

(87) PCT Pub. No.: WO2018/001635
PCT Pub. Date: Jan. 4, 2018

(65) Prior Publication Data
US 2019/0154486 A1    May 23, 2019

(30) Foreign Application Priority Data

Jun. 30, 2016 (DE) .................. 10 2016 007 905

(51) Int. Cl.
*G01F 1/84* (2006.01)
*G01F 1/74* (2006.01)
(Continued)

(52) U.S. Cl.
CPC .............. *G01F 1/8436* (2013.01); *G01F 1/74* (2013.01); *G01F 1/8477* (2013.01); *G01F 15/02* (2013.01);
(Continued)

(58) Field of Classification Search
CPC ..................................... G01F 1/84; G01F 1/74
See application file for complete search history.

(56) References Cited

U.S. PATENT DOCUMENTS 7,350,421 B2 *  4/2008  Anklin-Imhof ....... G01F 1/8409
                                                   73/861.355
7,555,962 B2 *  7/2009  Bitto .................... G01F 1/8409
                                                   73/861.355
(Continued)

FOREIGN PATENT DOCUMENTS

DE    102009027580 A1    1/2011
DE    102009055069 A1    6/2011
(Continued)

OTHER PUBLICATIONS

Search Report for German Patent Application No. 10 2016 007 905.3, German Patent Office, dated Feb. 3, 2017, 7 pp.
(Continued)

*Primary Examiner* — Jewel V Dowtin
(74) *Attorney, Agent, or Firm* — Christopher R. Powers; Endress+Hauser (USA) Holding Inc.

(57) ABSTRACT

A method serves for operating a measuring transducer of vibration-type having at least two oscillators, each of which is formed by a pair of measuring tubes, wherein the pairs of measuring tubes are arranged for parallel flow, wherein the
(Continued)

two oscillators have mutually independent oscillator oscillations with mutually differing eigenfrequencies for corresponding oscillation modes. The method includes steps of determining a first value of a primary measurement variable, or of a variable derived therefrom, using the first oscillator, determining a second value of the primary measurement variable, or of a variable derived therefrom, using the second oscillator, checking an actual ratio between the first value and the second value by comparison with an expected ratio between the first value and the second value, and outputting a signal when the actual ratio does not correspond to the expected ratio.

9 Claims, 4 Drawing Sheets

(51) Int. Cl.
  *G01F 25/00*  (2006.01)
  *G01N 11/16*  (2006.01)
  *G01F 15/02*  (2006.01)
  *G01N 9/00*  (2006.01)
(52) U.S. Cl.
  CPC ......... *G01F 25/0007* (2013.01); *G01N 11/16* (2013.01); *G01N 2009/006* (2013.01)

(56) References Cited

U.S. PATENT DOCUMENTS

| 7,658,115 | B2 * | 2/2010 | Rieder | G01F 1/8409 |
| | | | | 73/861.355 |
| 8,113,064 | B2 * | 2/2012 | Huber | G01F 1/8409 |
| | | | | 73/861.357 |
| 2009/0013799 | A1 | 1/2009 | Gysling | |
| 2011/0023626 | A1 | 2/2011 | Weinstein | |
| 2015/0160056 | A1 | 6/2015 | Schollenberger et al. | |

FOREIGN PATENT DOCUMENTS

| DE | 102012109729 A1 | 5/2014 |
| DE | 102015104931 A1 | 6/2016 |
| DE | 102015122661 A1 | 6/2017 |
| DE | 102016112002 A1 | 1/2018 |
| EP | 0749006 A1 | 12/1996 |
| EP | 2026042 A1 | 2/2009 |

OTHER PUBLICATIONS

Search Report for International Patent Application No. PCT/EP2017/061918, WIPO, dated Jul. 27, 2017, 13 pp.

* cited by examiner

METHOD FOR OPERATING A MEASURING TRANSDUCER OF VIBRATION-TYPE

CROSS-REFERENCE TO RELATED APPLICATIONS

The present application is related to and claims the priority benefit of German Patent Application No. 10 2016 007 905.3, filed on Jun. 30, 2016 and International Patent Application No. PCT/EP2017/061918 filed on May 18, 2017, the entire contents of which are incorporated herein by reference.

TECHNICAL FIELD

The present invention relates to a method for operating a measuring transducer of vibration-type, particularly a measuring transducer having at least two oscillators each formed by a pair of measuring tubes, wherein the pairs of measuring tubes are arranged for parallel flow, wherein the two oscillators have mutually independent oscillator oscillations with mutually differing eigenfrequencies $f_{i,j}$ for corresponding oscillation modes, wherein the index i refers to the oscillatory mode and the index j refers to the oscillator, thus $f_{i,1} \neq f_{i,2}$.

BACKGROUND

A measuring transducer with two mutually independently oscillators is described in the as-yet unpublished patent application DE 10 2015 104 931.7. The two oscillators comprise measuring tube pairs, which oscillate essentially independently of one another and which have different eigenfrequencies for corresponding modes. The mutually differing eigenfrequencies enable the oscillators to oscillate actually independently of one another, without influencing one another.

To the extent that the measuring transducer has two parallel flow, independently measuring subsystems with transfer functions defined for the two subsystems, measured values to be output can result from evaluation of measurement results of both subsystems.

SUMMARY

It is an object of the present invention to provide a method, which monitors the validity of the measured values to be output, or the state of a measuring point, at which the measuring transducer is arranged. The object of the invention is achieved by the method as defined in independent claim 1.

The method of the invention serves for operating a measuring transducer of vibration-type having at least two oscillators, each of which is formed by a pair of measuring tubes, wherein the pairs of measuring tubes are arranged for parallel flow, wherein the two oscillators have mutually independent oscillator oscillations with mutually differing eigenfrequencies $f_{i,j}$ for corresponding oscillation modes, wherein the index i refers to the oscillatory mode and the index j refers to the oscillator, thus $f_{i,1} \neq f_{i,2}$, wherein the method comprises steps as follows: determining by means of the first oscillator a first value of a primary measurement variable, or of a variable derived therefrom; determining by means of the second oscillator a second value of the primary measurement variable, or of a variable derived therefrom; checking an actual ratio between the first value and the second value by comparison with an expected ratio between the first value and the second value; and outputting a signal when the actual ratio does not correspond to the expected ratio.

Primary measurement variables of an oscillator are, for example, the eigenfrequencies of oscillation modes of the oscillator, a phase angle between a flow dependent Coriolis mode and a wanted mode, with which the oscillator is excited, thus a phase angle associated with the flow dependent exciting of the so-called Coriolis mode, or the ratio between a sensor signal and an excitation signal, wherein the sensor signal depends on an oscillation amplitude, or an oscillation velocity, of the oscillator, and wherein the excitation signal represents the excitation power.

In a further development of the invention, the first value and the second value comprise eigenfrequencies of the first oscillator and the second oscillator, respectively, or variables derived from the eigenfrequencies.

In a further development of the invention, the first value and the second value comprise density measured values based on the eigenfrequencies of the first and second oscillators, respectively.

In a further development of the invention, the density measured values are corrected density measured values calculated based on preliminary density measured values taking into consideration velocity of sound in the medium, to correct the influence of compressibility of a medium guided in the measuring tubes of the oscillators.

In a further development of the invention, the velocity of sound is determined based on at least one of the two eigenfrequencies and a third eigenfrequency of one of the oscillators, as well as a preliminary density measured value derived therefrom.

In a further development of the invention, the first value and the second value comprise mass flow values through the measuring tubes of the first and second oscillators, respectively.

In a further development by the invention, the first value and the second value comprise mass flow values corrected for the compressibility influence of the medium.

In a further development of the invention, the expected ratio is determined as a function of a value of the viscosity of the medium.

According to a further development of the invention, the expected ratio of two mass flow values depends on at least one reference ratio, which was ascertained, for example, in a calibration of the measuring transducer, or after installation at a measuring point, so that the reference ratio takes the installed situation into consideration.

In a further development of the invention, the value for the viscosity is based on a ratio between a sensor signal and an excitation signal ascertained at an eigenfrequency, wherein the sensor signal depends on the deflection, or velocity, of the oscillating measuring tubes of an oscillator, and wherein the excitation signal represents the exciter power, with which the oscillator is excited to oscillate.

BRIEF DESCRIPTION OF THE DRAWING

The invention will now be explained in greater detail based on examples of embodiments illustrated in the appended drawing, the figures of which show as follows.

DETAILED DESCRIPTION

Figure 1:
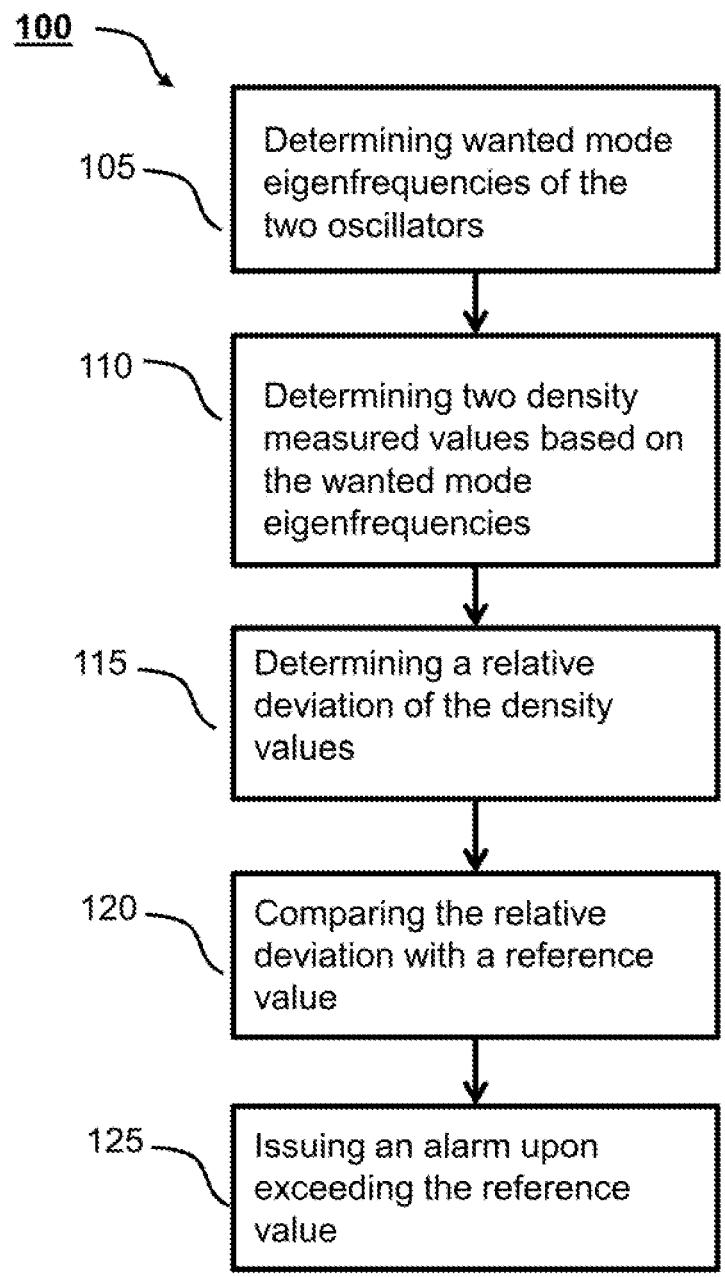
FIG. 1 shows a flow diagram of a first example of an embodiment of the present invention.

The first example of an embodiment of the method 100 of the invention for determining density value begins in FIG. 1 in a step 105 with the determining of the different eigenfrequencies of the $f_{i,j}$ wanted modes of the two oscillators. The sought eigenfrequencies can be ascertained by maximizing the ratios of oscillation amplitude to mode-specific excitation power by varying the excitation frequencies.

Using the ascertained eigenfrequencies $f_{1,1}$ and $f_{1,2}$, in a step 110, density values $\rho_{1,1}$ and $\rho_{1,2}$ are determined according to the formula:

$$\rho_{1,j} = c_{0,i,j} + c_{1,1,j}\frac{1}{f_{1,j}^2} + c_{2i}\frac{1}{f_{1,j}^4},$$

wherein $c_{0,1,j}$, $c_{1,1,j}$ and $c_{2,1,j}$ with j=1, 2 are mode dependent coefficients for the wanted modes of the two oscillators.

To the extent that it can be assumed therefrom that the medium in the measuring tubes is a practically incompressible medium, or has no gas load, the density values $\rho_{1,1}$ and $\rho_{1,2}$ can be directly processed in method steps as follows. For this, in step 115, a relative deviation $\Delta\rho$ of density values is determined as $$\Delta\rho = \frac{|\rho_{1,1} - \rho_{1,2}|}{\rho_{1,1} + \rho_{1,2}}$$

In a step 120, the density deviation $\Delta\rho$ is then compared with a limit value $\Delta\rho_{ref}$. When the density deviation $\Delta\rho$ exceeds the limit value, in step 125, an alarm signal is output.

To the extent that the medium is compressible, the density values $\rho_{1,1}$ and $\rho_{1,2}$ are considered to be only preliminary density measured values and must still be corrected because of the so-called resonator effect. In this regard, knowledge of the current velocity of sound in the medium is required, which is either externally measured and supplied or can be ascertained using the measuring of an eigenfrequency of a so-called f3 mode of at least one of the two oscillators. Details for this are disclosed in the as-yet unpublished patent applications DE 10 2015 122 661 and DE 10 2016 112 002.

For correction of the resonator effect, a further preliminary density value $\rho3_{,j}$ is ascertained, for example, based on the eigenfrequency of an f3 mode of an oscillator.

$$\rho_{3,j} = c_{0,3,j} + c_{1,3,j}\frac{1}{f_{3,j}^2} + c_{2i}\frac{1}{f_{3,j}^4},$$

Then, the ratio V of the preliminary density values is formed based on the wanted mode and the f3 mode of the same oscillator, thus, for example, by division of the preliminary density values $\rho_{3,1}$ and $\rho_{1,1}$ to form $V:=\rho_{3,1}/\rho_{1,1}$.

Then, the velocity of sound c is determined, which in the case of the associated measured eigenfrequencies of the bending oscillation modes leads to the calculated ratio V of the preliminary density values:

$$\frac{\left(1 + \dfrac{r}{\left(\dfrac{g_1 \cdot c}{f_{3,1}}\right)^2 - b}\right)}{\left(1 + \dfrac{r}{\left(\dfrac{g_1 \cdot c}{f_{1,1}}\right)^2 - b}\right)} = V$$

wherein r is, for instance, 0.84, b=1 and $g_1$ is a measuring tube dependent proportionality factor between velocity of sound and resonance frequency of the medium oscillating in the measuring tube. A typical value for $g_1$ is, for example, for instance, 10/m.

Using the ascertained velocity of sound, then for the preliminary density values a mode specific correction term $K_i$ is calculated according to:

$$K_{1,1} := \left(1 + \frac{r}{\left(\dfrac{g \cdot c}{f_{i,j}}\right)^2 - 1}\right).$$

The preliminary density values $\rho_{i,j}$ are then divided by the correction term $K_{i,j}$, to obtain the corrected density values $\rho_{corr,i,j}$:

$$\rho_{corr,i,j} := \frac{\rho_{i,j}}{K_{i,j}}.$$

The corrected density values $\rho_{corr,1,1}$ and $\rho_{corr,1,2}$ can then in step 115 be taken into consideration for determining the deviation between the density measured values, and the following steps 120, 125 proceed as above described.

Figure 2:
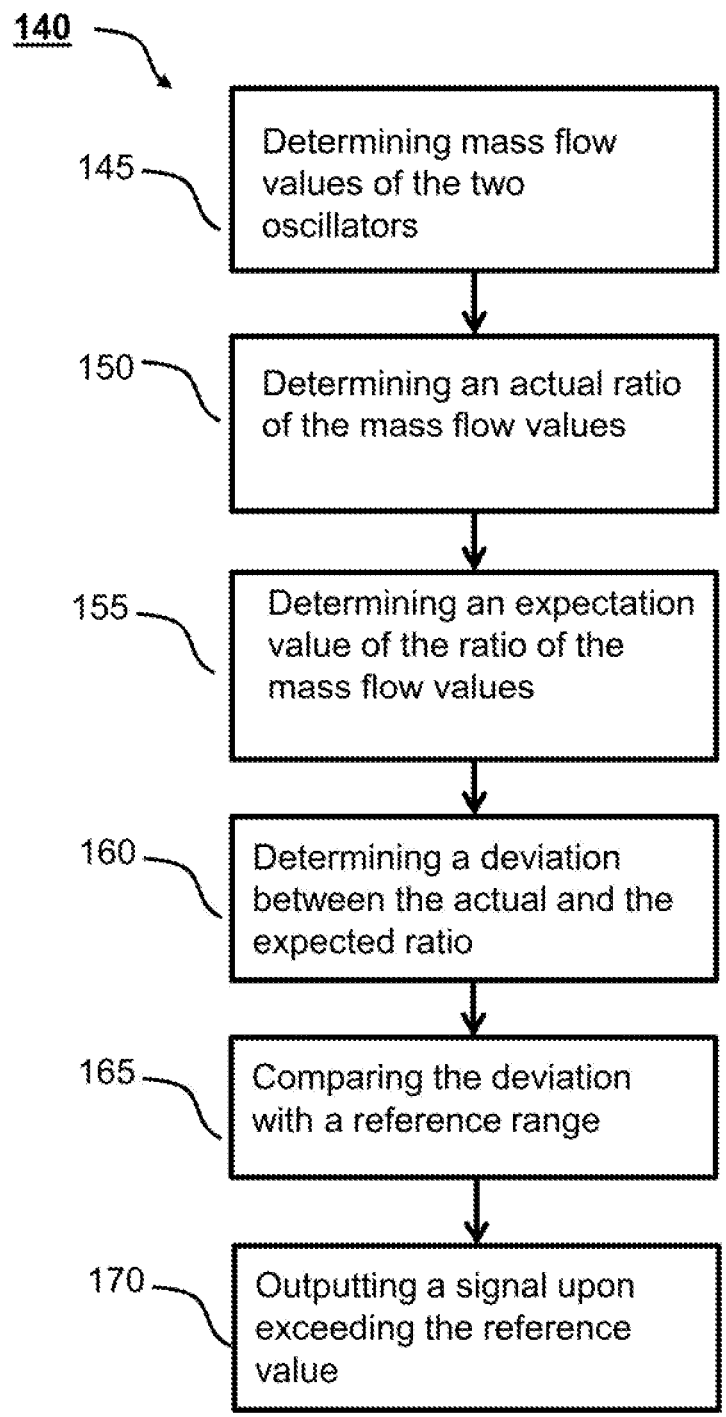
FIG. 2 shows a flow diagram of a second example of an embodiment of the present invention.

The second example of an embodiment of a method 140 of the invention for determining a mass flow value begins, as shown in FIG. 2, in a step 145 with the determining of mass flow values through the two oscillators. For this, in each case, the phase angle between the Coriolis mode and the wanted mode is determined. From this, there result, taking into consideration oscillator specific calibration factors, the mass flow values through the two oscillators. The total mass flow results from the sum of the mass flow values for the two oscillators.

To the extent that from this it can be assumed that the medium in the measuring tubes is a practically incompressible medium, or has no gas load, the mass flow measurement values ascertained in such a way can be directly processed in the method steps as follows. Thus, in step 150, for example, a quotient of the two mass flow values is determined.

In a step 155, an expectation value for this ratio is ascertained. Entering into this expectation value are, for example, the sum of the two flow values and a value for the viscosity of the medium. Used as calculational basis can be the actual ratio as a function of these input variables at a reference point in time, for example, registered at start-up of the measuring transducer in a measuring point and modeled as a function of the input variables. Using the so ascertained model, an expectation value is determined as a function of the input variables. The viscosity value of the medium can be ascertained, for example, based on the ratio of oscillation amplitude and excitation power of an oscillator.

In a step 160, a deviation between the actual ratio and the expectation value is ascertained, for example, by quotient forming.

In a step 165, whether the quotient lies within a reference range is checked, for example, 95% to 105%.

In the case of a negative finding, an alarm is output in a step 170.

To the extent that the medium is compressible, the mass flow values are treated as only preliminary mass flow values and corrected for error influences because of the resonator effect. In this regard, knowledge of the current velocity of sound in the medium is required, which can be ascertained such as above described. Details for this are also disclosed in the as-yet unpublished patent applications, DE 10 2015 122 661 and DE 10 2016 112 002.

The correction terms $K_{m,j}$ for correcting preliminary mass flow values of an oscillator for the influence of the resonator effect result from the correction terms for the preliminary density value based on the eigenfrequencies of the wanted modes of the oscillators, as follows: $K_{m,j}:=2*K_{1,j}-1$, wherein j=1, 2 are the indices of the oscillators.

The corrected mass flow values of the oscillators result from dividing the preliminary mass flow values by the relevant correction terms $K_{m,j}$ for each oscillator.

With the corrected mass flow values, the method 140 can then be started at step 150.

An example of an embodiment of a measuring transducer 200 of the invention will now be explained in greater detail based on FIGS. 3a to 3d. The measuring transducer 200 includes four curved measuring tubes 210a, 210b, 210c, 210d. The measuring tubes 210a, 210b, 210c, 210d extend between an inlet end collector 220 and an outlet end collector 220, and are connected with these securely, for example, by roll expansion, hard soldering or welding. Extending between the collectors 220 is a sturdy support tube 224, which is durably connected with both collectors, whereby the collectors 220 are rigidly coupled together. Support tube 224 includes, on its upper side, openings, through which the measuring tubes 210a, 210b, 210c, 210d extend from the collectors 220 out of the support tube 224 and then back in.

The collectors 220 have terminally, in each case, a flange 222, by means of which the measuring transducer 200 can be interposed in a pipeline. Through central openings 223 in the flanges 222, a medium flowing in the pipeline flows through the interposed measuring transducer 200, especially its measuring tubes 210a, 210b, 210c, 210d, in order that the mass flow of the medium can be measured using the measuring transducer 200.

A first measuring tube 210a and a second measuring tube 210b are connected inlet end and outlet end (in the following, on both ends), in each case, with two node plates 232a, 234a, wherein by the position of the two inner node plates 232a, thus by those, which on both ends are, in each case, farthest removed from the corresponding collector 220, a first oscillatory length of a first oscillator formed by the first measuring tube 210a, and the second measuring tube 210b is fixed. This first oscillatory length has large influence on a wanted mode and an f3 mode of the first oscillator, especially on its eigenfrequencies $f_{1,1}$ and $f_{3,1}$, with which the first oscillator can be excited.

A third measuring tube 210c and a fourth measuring tube 210d are connected at both ends, in each case, with two node plates 232c, 234c, wherein by the position of the two inner node plates 232c, thus by those, which on both ends are, in each case, farthest removed from the corresponding collector 220, a second oscillatory length of a second oscillator formed by the third measuring tube 210c and the fourth measuring tube 210d is fixed. This second oscillatory length has large influence on a wanted mode and an f3 mode of the second oscillator, especially on its eigenfrequencies $f_{1,2}$ and $f_{3,2}$, with which the second oscillator can be excited.

The outer node plates 234a, 234c, which, in each case, are arranged between the inner node plates 232a, 232c and the collectors 220, serve especially to define other oscillation nodes, in order, on the one hand, to reduce the mechanical maximum stresses on the oscillating measuring tubes, and, on the other hand, to minimize out-coupling of oscillatory energy into a pipeline, in which the measuring transducer is mounted, or in-coupling of disturbing oscillations from the pipeline.

The node plates 232a, 232b, 234a, 234b define oscillation nodes for the measuring tubes. Between the inner node plates 232a, 232b, the measuring tubes 210a, 210b can freely oscillate, so that the position of the inner node plates essential determine the oscillation characteristics of the oscillator formed by the measuring tubes 210a, 210b, especially eigenfrequencies of oscillation modes of the oscillator.

The free oscillatory length of the measuring tubes 210a, 210b of the first oscillator is significantly greater than free oscillatory length of the measuring tubes 210c, 210d of the second oscillator, wherein the measuring tubes 210a, 210b of the first oscillator are guided in a higher curve than the measuring tubes 210c, 210d of the second oscillator. This leads, for example, to the fact that in the case of the illustrated measuring transducer, which has measuring tubes with an outer diameter of 3 inch, thus about 76 mm, and a wall thickness of 3.6 mm, assuming filling of the measuring tubes with an incompressible medium with a density of water, the first oscillator has a wanted mode with an eigenfrequency of, for instance, 210 Hz, while the eigenfrequency of the wanted mode of the second oscillator is, for instance, 160 Hz. The corresponding eigenfrequencies of the f3 modes are, in each case, for instance, a factor of 6 greater.

Figure 4:
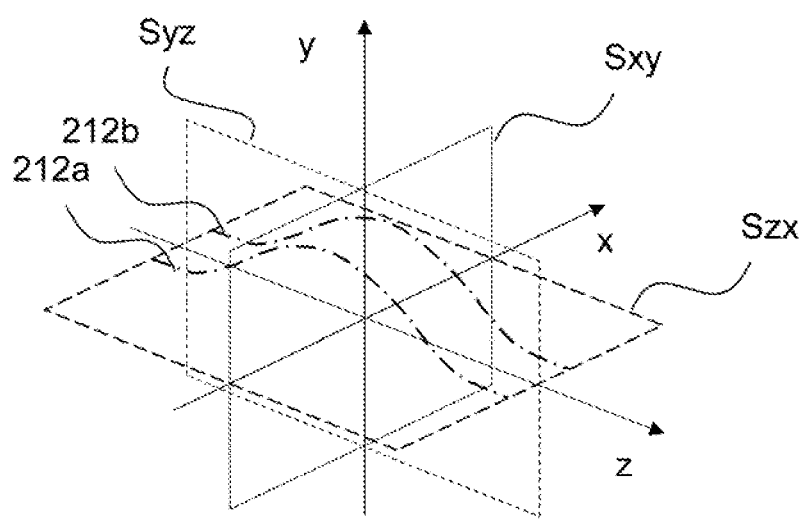
FIG. 4 shows a coordinate system for describing some properties of the measuring transducer of the invention.

Before the operation of the measuring transducer 200 of the invention is explained further, its symmetry characteristics will be presented based on FIG. 4.

Shown in FIG. 7 are measuring tube central axes 212a, 212b of the first measuring tube and the second measuring tube, which form the first oscillator. The measuring tube central axes 212a, 212b extend symmetrically to a first mirror plane Syz, the measuring transducer longitudinal plane, which extends between the measuring tubes. The measuring tube central axes extend further symmetrically to a second mirror plane Sxy, the measuring transducer transverse plane, which extends perpendicularly to the measuring transducer longitudinal plane.

The measuring tube axes 212a, 212b of the first oscillator extend preferably in planes, which extend in parallel with the first measuring transducer longitudinal plane.

Regarding a third plane Szx, which extends perpendicularly to the first mirror plane and the second mirror plane, and in which the measuring tube axes 212a, 212b extend into the collectors, no symmetry of the measuring tubes is present.

The above explanations hold correspondingly for the measuring tube axes of the third and fourth measuring tubes of the second oscillator.

Preferably, the axes of the first measuring tube and the third measuring tube extend in a first plane as well as the measuring tube axes of the second and fourth measuring tubes in a second plane, each of which extends in parallel with the first mirror plane.

The line of intersection between the first mirror plane Syz and the third plane defines a Z axis of a coordinate system of the measuring transducer. The line of intersection between the second mirror plane Sxy and the third plane Szx defines an X axis of the coordinate system, and the line of intersection between the first mirror plane Syz and the second mirror plane defines the Y axis of the coordinate system. With the coordinates defined in such a way, we return to FIGS. 3a to 3d.

For exciting bending oscillations of the measuring tubes in the X direction, a first exciter mechanism 240a is provided—centrally in the measuring transducer with reference to the longitudinal direction, or the Z axis—between the first measuring tube 210a and the second measuring tube 210b of the first oscillator and a second exciter mechanism 240c is provided—also centrally in the measuring transducer with reference to the longitudinal direction, or the Z axis—between the third measuring tube 210c and the fourth measuring tube 210d of the second oscillator, for example, in each case, an inductive exciter mechanism, which includes, for example, a coil on one measuring tube and a plunging armature on the oppositely lying measuring tube. For registering the oscillations of the measuring tube pairs, the oscillators are provided in the longitudinal direction symmetrically to the exciter mechanisms 240a, 240c, in each case, with a first sensor arrangement 242a-1, 242c-1 and a second sensor arrangement 242a-2, 242c-2, each of which is embodied as an inductive arrangement with a coil on one tube and a plunging armature on the other tube. Details of such sensor arrangements are known to those skilled in the art and need not be explained here in further detail. (For purposes of perspicuity, the positions of the exciter mechanisms and the sensor arrangements were indicated with reference characters only in FIG. 1b).

The oscillators are each excited with at least one of their current eigenfrequencies of the wanted mode (f1 mode) and/or of the f3 mode, wherein, for this, either the exciter mechanisms can, in each case, be driven by an independent driver circuit with the signal of a particular eigenfrequency, or wherein the exciter mechanisms can be connected in series and supplied with a superimposed signal of the eigenfrequencies of both oscillators. Due to the high quality of the oscillators, each oscillator is excited to oscillate practically with only its eigenfrequency.

Figure 3A:
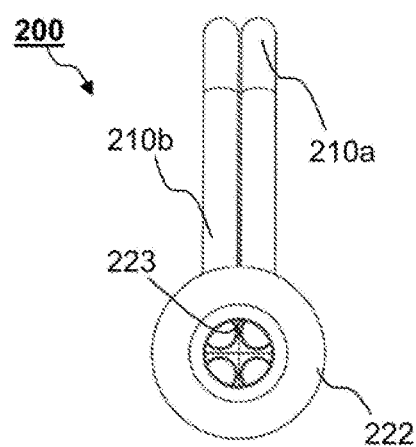
FIG. 3a shows a schematic front view of a first example of an embodiment of a measuring transducer of the invention.
Figure 3B:
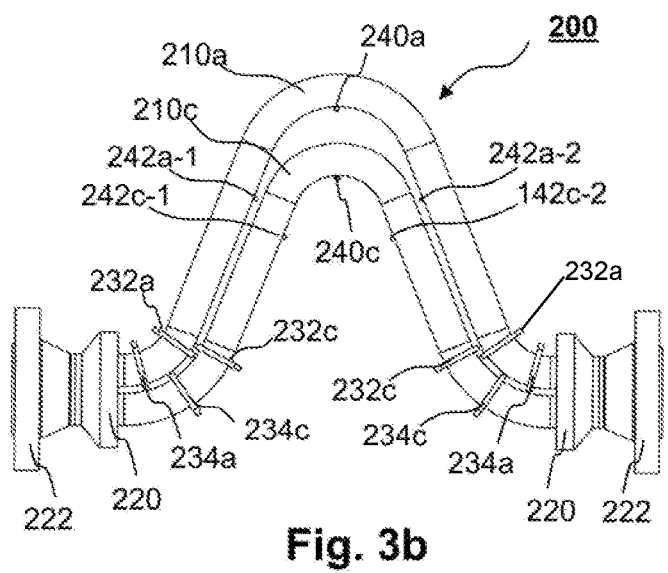
FIG. 3b shows a schematic, side view of the first example of an embodiment of a measuring transducer of the invention without support tube.
Figure 3C:
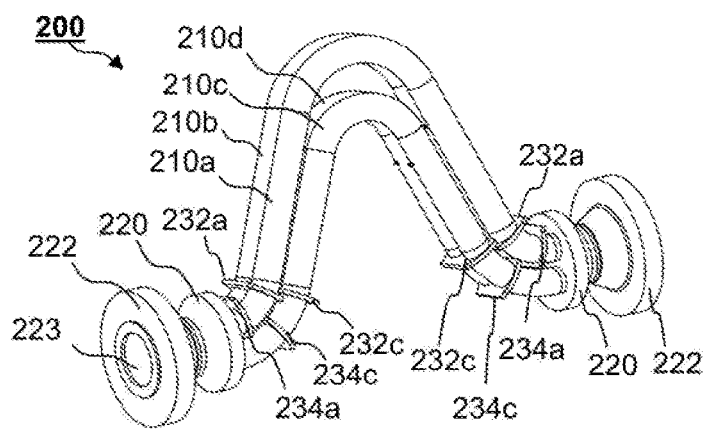
FIG. 3c shows a perspective view of the first example of an embodiment of a measuring transducer of the invention without support tube.
Figure 3D:
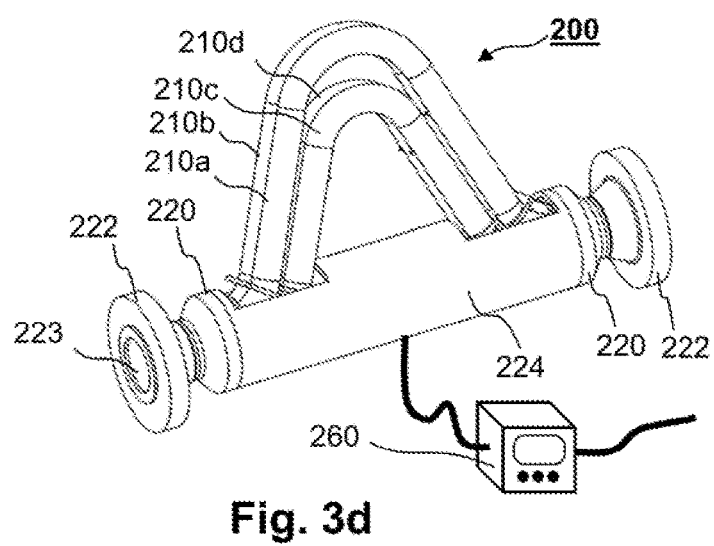
FIG. 3d shows a perspective view of the first example of an embodiment of a measuring transducer of the invention with support tube.

The measuring transducer further includes, as shown schematically in FIG. 3d, an electronics unit 260, which contains an operating- and evaluation circuit, which includes the driver circuits for exciting the measuring tube oscillations as well as signal processing circuits for processing the sensor signals. Furthermore, the operating- and evaluating circuit includes at least one microprocessor for control of the measuring transducer and for performing the method of the invention. The electronics unit 260 is connectable via lines to a superordinated unit, for example, a control system, from which it is supplied power, and to which it outputs measurement data. The electronics unit can be arranged separated or mounted on the support tube or in a housing (not shown) around the measuring tube curves.

The invention claimed is:

1. A method for operating a measuring transducer of vibration-type, the method comprising:
   providing a measuring transducer including at least two oscillators, each of which is formed by a pair of measuring tubes, wherein the pairs of measuring tubes are arranged for parallel flow, wherein the at least two oscillators have mutually independent oscillator oscillations with mutually differing eigenfrequencies for corresponding oscillation modes;
   determining a first value of a primary measurement variable, or of a variable derived therefrom, using a first oscillator of the at least two oscillators;
   determining a second value of the primary measurement variable, or of a variable derived therefrom, using a second oscillator of the at least two oscillators;
   checking an actual ratio between the first value and the second value by comparison with an expected ratio between the first value and the second value; and
   outputting a signal when the actual ratio does not correspond to the expected ratio.

2. The method of claim 1, wherein the first value and the second value include eigenfrequencies of the first oscillator and the second oscillator, respectively, or variables derived from the eigenfrequencies.

3. The method of claim 2, wherein the first value and the second value include density measured values based on the eigenfrequencies of the first and second oscillators, respectively.

4. The method of claim 3, wherein the density measured values are corrected density measured values calculated based on preliminary density measured values using a velocity of sound in a medium to correct the influence of compressibility of the medium flowing through the measuring tubes of the oscillators.

5. The method of claim 4, wherein the velocity of sound is determined based on at least one of the two eigenfrequencies, a third eigenfrequency of one of the oscillators and a preliminary density measured value derived therefrom.

6. The method of claim 1, wherein the first value and the second value include mass flow values of a medium flowing through the measuring tubes of the first and second oscillators, respectively.

7. The method of claim 6, wherein the first value and the second value include mass flow values corrected for the compressibility influence of the medium.

8. The method of claim 6, wherein the expected ratio is determined as a function of a value of a viscosity of the medium.

9. The method of claim 8, wherein the value for the viscosity is ascertained based on a ratio between a sensor signal and an excitation signal at an eigenfrequency,
   wherein the sensor signal depends on a deflection, or velocity, of the oscillating measuring tubes of an oscillator, and
   wherein the excitation signal represents the power of the exciter with which the oscillator is excited to oscillate.

* * * * *